United States Patent
Burke et al.

(10) Patent No.: US 9,250,618 B2
(45) Date of Patent: Feb. 2, 2016

(54) PWM BASED ENERGY MANAGEMENT WITH LOCAL DISTRIBUTED TRANSFORMER CONSTRAINTS

(71) Applicant: General Electric Company, Schenectady, NY (US)

(72) Inventors: William Jerome Burke, Louisville, KY (US); John Keith Besore, Prospect, KY (US); Jeff Donald Drake, Louisville, KY (US); Charles Ray Smith, Simpsonville, SC (US); David Joseph Najewicz, Prospect, KY (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 13/752,450

(22) Filed: Jan. 29, 2013

(65) Prior Publication Data

US 2014/0214225 A1 Jul. 31, 2014

(51) Int. Cl.
*G05B 13/02* (2006.01)
*G05B 15/02* (2006.01)
*G06Q 50/06* (2012.01)
*H04L 12/28* (2006.01)
*H02J 3/14* (2006.01)

(52) U.S. Cl.
CPC .............. *G05B 13/02* (2013.01); *G05B 15/02* (2013.01); *G06Q 50/06* (2013.01); *H02J 3/14* (2013.01); *H04L 12/2803* (2013.01); *G05B 2219/2639* (2013.01); *G05B 2219/2642* (2013.01)

(58) Field of Classification Search
CPC .......................... Y02B 70/3225; G05B 13/02

USPC ......................................................... 700/295
See application file for complete search history.

(56) References Cited

U.S. PATENT DOCUMENTS

| 2003/0055677 | A1* | 3/2003 | Brown et al. ................ 705/1 |
| 2009/0187499 | A1* | 7/2009 | Mulder et al. .............. 705/30 |
| 2011/0087382 | A1 | 4/2011 | Santacatterina et al. |
| 2011/0106327 | A1* | 5/2011 | Zhou et al. ................ 700/291 |
| 2011/0106328 | A1* | 5/2011 | Zhou et al. ................ 700/291 |
| 2012/0158198 | A1 | 6/2012 | Black et al. |

FOREIGN PATENT DOCUMENTS

WO    WO/2012/147155    * 11/2012

OTHER PUBLICATIONS

English translation of publication No. WO2012147155 included WO2012147155-JP2011060120 English_Translation_POWER Management Device Power Management System . . . .*

* cited by examiner

*Primary Examiner* — Tejal Gami
(74) *Attorney, Agent, or Firm* — Dority & Manning, P.A.

(57) ABSTRACT

The present subject matter relates energy management systems and methodologies wherein control over local appliances is implemented to control stress on a local transformer to which a plurality of user locations may be connected. Some of the user locations are provided with home energy management (HEM) devices that control operation of certain appliance at their location based in part on constraints associated with the local transformer. The HEMs may negotiate among themselves how to meet the constraints of the local transformer and, in certain circumstances, take into consideration estimates of usage at user locations connected to the local transformer but that do not have their own HEM.

19 Claims, 2 Drawing Sheets

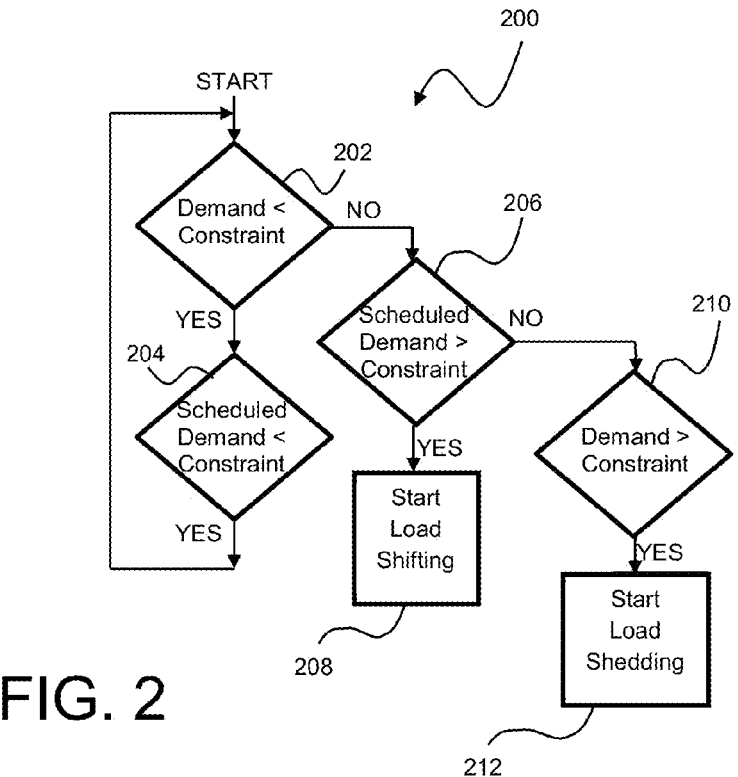
FIG. 2
Home PWM
FIG. 3
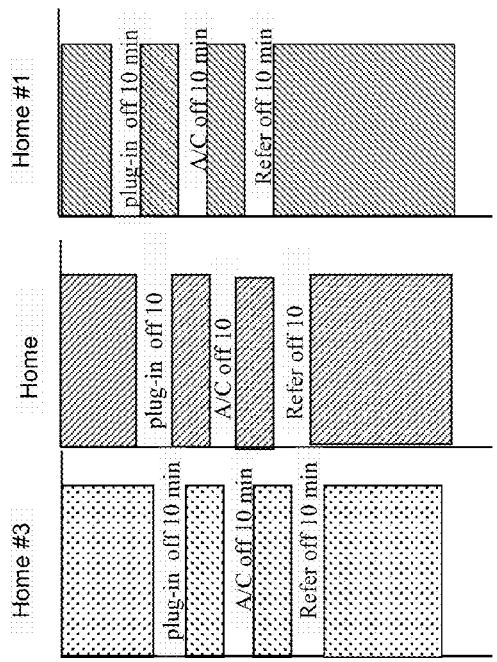

PWM BASED ENERGY MANAGEMENT WITH LOCAL DISTRIBUTED TRANSFORMER CONSTRAINTS

FIELD OF THE INVENTION

This disclosure relates generally to energy management systems for homes. More particularly, the disclosure relates to joint operation of a group of home energy management systems.

BACKGROUND OF THE INVENTION

Certain utility companies are experiencing stains on their distribution systems as well as shortage in electrical generating capacity due to increasing customer demand for electricity. For example, the advent of plug-in electric vehicles is bringing with it increased demand. In certain situations, utility companies are becoming more concerned not only with their ability to meet their customers' demand for electricity during peak demand hours but also the additional stress that is being placed on their equipment, most notably local transformers that they will have to endure such stress.

Increasing electrical generating capacity to meet the shortfall can be difficult due to increasing fuel prices. As a result, utility companies can be forced to buy electricity to meet their customers' demands. If peak demand hours can be reduced, then utility companies and their customers can realize a potential cost savings, and the peak load that the utility companies have to accommodate can also be lessened. But simply increasing supply may not fully address the additional stress placed on local equipment including local transformers.

Certain energy management systems include features for deactivating power consuming devices during the on-peak hours. Such energy management systems can determine when variable electricity-pricing schemes go into effect via schedules published by utility companies and inputted by customers or via signals sent by utility companies, e.g., over a wireless network or through a phone network, directly to the energy management systems. However, inputting schedules manually can be tedious and time consuming. Similarly, energy management systems relying upon utility company input to function properly can function improperly if the utility company fails to deliver the schedules as expected. Alternative energy management plans provide systems and methods with time of use (TOU) and/or demand response management systems (DRMS) energy programs.

There is a need to provide a system that can automatically operate power consuming devices in order to reduce consumer's electric bills and also to reduce the load on generating plants and local equipment including local transformers during peak hours. Active and real time communication of energy costs of appliances to the consumer may enable informed choices of operating the power consuming functions of the appliance but in many instances consumers may not be present to make necessary usage adjustments or may simply ignore provided information.

In view of these and other issues, there is a need to provide an improved system that can enable automatic control of power consuming devices during a DRMS event, and thus, provide opportunity for utility companies to better meet the needs of their customers while limiting stress placed on their own equipment.

BRIEF DESCRIPTION OF THE INVENTION

Additional aspects and advantages of the invention will be set forth in part in the following description, or may be apparent from the description, or may be learned through practice of the invention.

The present subject matter relates to an energy management system, having a central control system including a demand response server, a power transmission system configured to supply electrical power to a plurality of user locations by way of a common local transformer and a plurality of home energy management systems in communication with the demand response server. In such system, each of the plurality of home energy management systems is configured for communications with at least one home appliance In such systems the demand response server is configured to transmit local transformer identification and constraint information to each of the plurality of home energy management systems. Based on such information each of the plurality of home energy management systems together form a local network for data sharing among each other instructs the at least one home appliance to modify its energy consumption based at least in part on shared data to meet the constraints of the local transformer.

The present subject matter also relates to methodology for management of energy usage. Such method provides for coupling a plurality of user locations to a common local transformer to provide electrical power to said user locations, coupling a home energy management system to at least one appliance at at least some of the user locations, sending information regarding transformer identification and constraints to each of the home energy management system, implementing a local network of the home energy management systems based on the transformer identification, sharing usage data within the local network, and operating the at least one appliance based at least in part on the shared data and the constraint information.

The present subject matter further relates to a power distribution and control system. Such system includes a central control system, a source of power, at least one local transformer with a plurality of power consumption locations each coupled to receive power therefrom, at least one power consuming device located at each of the plurality of power consumption locations, an energy management device located at each of the plurality of power consumption locations, and an advanced metering infrastructure configured to provide communications between the central control system and each the energy management device.

In accordance with such systems, the central control system is configured to transmit local transformer identification and constraint information to each of the energy management devices so that each of the plurality of energy management devices together form a local network based on the transformer identification for data sharing among each other and so that each of the plurality of energy management devices instructs the at least one home appliance to modify its energy consumption based at least in part on shared data to meet the constraints of the local transformer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a chart illustrating steps for a process in accordance with the present subject matter; and FIG. 3 illustrates exemplary sequences of Home Pulse Width Modulation (PWM) responses produced in response to coordinated HEM signals in accordance with the present subject matter.

Figure 1:
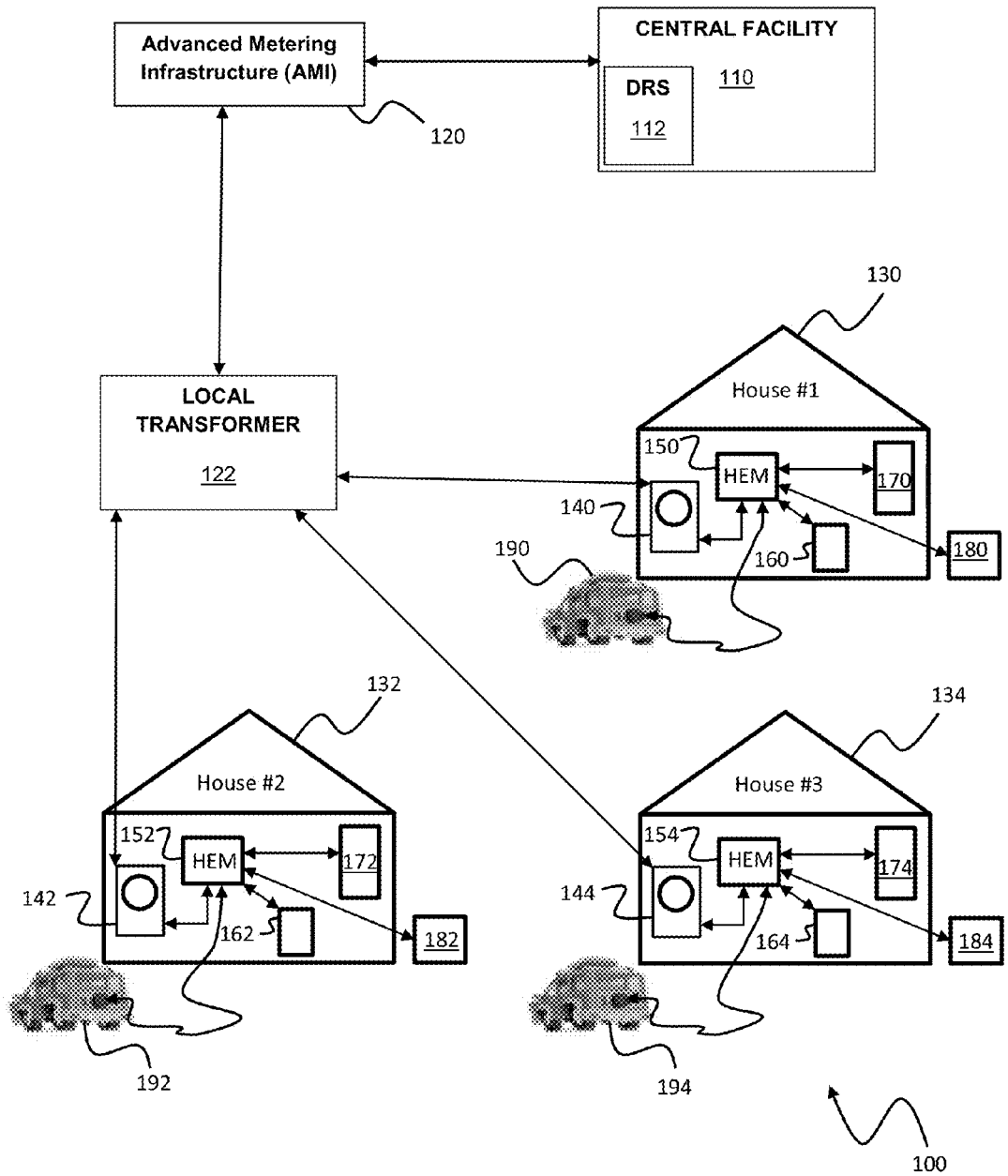
FIG. 1 provides an overview of power distribution system including a local distribution transformer in accordance with an exemplary embodiment of the present subject matter.

Repeat use of reference characters throughout the present specification and appended drawings is intended to represent same or analogous features or elements.

DETAILED DESCRIPTION OF THE INVENTION

As discussed in the Summary of the Subject Matter section, the present subject matter is particularly concerned with home energy management (HEM) systems and methodologies for responding to local energy distribution needs.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With initial reference to FIG. 1, there is provided provides an overview of power distribution system 100 including a local distribution transformer 122 in accordance with an exemplary embodiment of the present subject matter. In accordance with exemplary embodiments of the present subject matter, power distribution system includes a Central Facility 110 that, for purposes of illustration may be considered to correspond to various utility elements including, without limitation, generating equipment and head end control and communications equipment for Advanced Metering Infrastructure (AMI) 120. One subsystem within Central Facility 110 may correspond to a Demand Response Server (DRS) 112. DRS 112 may provide several functionalities but, for purposes of the present subject matter, DRS 112 is responsible for sending (pushing) certain information through AMI 120 relating to the local transformer 122 as will be explained more fully later.

Those of ordinary skill in the art will appreciate that AMI 120 may correspond to a vast number of devices including transmission lines over which power and possibly communications signals may flow to a large number of individual homes and other facilities or locations (user locations), represented herein as House #1, House #2, House #3, 130, 132, 134. AMI 120 may also include various communications related features including wireless communications or power line communications systems that may be employed to exchange information between individual home or other locations and a central facility relating to consumption and control of such utilities all in accordance with well-known and commonly used AMI arrangements as are fully understood by those of ordinary skill in the art.

It should also be appreciated that while the present disclosure is particularly directed to home energy management, such may also be applied to energy management for other facilities including without limitation, commercial and public facilities whose energy demand may also be controlled based on the technology of the present subject matter. Thus in the context of the present disclosure, the use of the terms "home" or "house" is fully intended to include other structures whether used as a residential facility or for some other purpose (generically, user locations) as long as such facility contains or has associated therewith, energy consuming appliances whose energy consumption may be controlled in accordance with the present subject matter. Further the term "appliances" is intended to include all energy consuming devices that may be located at any user location including, without limitation, refrigerators, dryers, HVAC systems, plug-in vehicles and their charging systems, and water heaters.

With continued reference to FIG. 1, there are representatively illustrated three houses 130, 132, 134 each of which is supplied with electrical power from a utility by way of a common local transformer 122 and includes associated therewith systems providing bidirectional communications with Central Facility 110 by way of AMI 120. In an exemplary arrangement, homes 130, 132, 134 are each provided with an electric utility meter 140, 142, 144 containing metrology components as well as communication components that operate to monitor and report energy consumption information to Central Command and Control 110. Each home 130, 132, 134 is also provided with a Home Energy Management (HEM) system 150, 152, 154 configured to receive instructions from Central Facility 110. Such HEM systems 150, 152, 154 may then provide instructions to individual appliances associated with the individual homes 130, 132, 134. In an alternative configuration, HEM systems may be incorporated directly in electric utility meters 140, 142, 144 or, as illustrated, may correspond to stand alone units. Further it should be appreciated that while HEM systems 150, 152, 154 are illustrated as connected to various home appliances including representatively, dryers 160, 162, 164, refrigerators 170, 172, 174, HVAC systems 180, 182, 184, and plug-in electric vehicles 190, 192, 194, such connections may correspond to either wired power connections and wired and/or wireless connections over which control signals may be uni-directionally or bi-directionally transmitted.

In accordance with the present subject matter, each home appliance 160, 162, 164, 170, 172, 174, 180, 182, 184, and plug-in electric vehicle 190, 192, 194 operates using synchronized low frequency Pulse Width Modulation (PWM) wherein all the HEM systems 150, 152, 154, operate as nodes on a local network by association with a common local transformer 122. More specifically, HEM systems 150, 152, 154 are each configured to form a local network among themselves and with their common local transformer 122 and to then act as a group to control (limit) the current load on local transformer 122 in order to avoid damaging the transformer. In this manner the individual HEMs are able to control the aggregated average operating power level at which each home appliance needs to operate to achieve a desired goal In accordance with the present subject matter, in order for the several HEMs to form a network, they all need to know their transformer and the neighbors coupled to that same transformer. This is achieved by assigning each transformer in the distribution network a unique identifier. When the individual HEMs 150, 152, 154 are first set up, the transformer identifier may be input into a configuration screen on the HEM (not separately illustrated), or pushed to the HEM from a demand response server (DRS) that is a part of Central Facility 110. In certain instance it is possible that not all of the homes connected to a particular local transformer are equipped with a HEM system. For that reason, each HEM may also receive information from the DRS including the number of houses connected to their local transformer. Each HEM 130, 132, 134 is configured to use the utility backhaul (AMI) network, for example, to connect with the other HEMs associated with the same transformer identifier. In instances where the backhaul network is a mesh network, then communications traffic does not need to go through the backhaul servers, and the communications literally remain local. Other types of backhaul networks with high bandwidth may also be used to establish the specific transformer centric network.

Once the local network is established, the individual HEMs 150, 152, 154 manage the power consumption of each house 130, 132, 134 connected to transformer 122 while maintaining communications with each other through their association with their common local transformer 122. Each of the HEMs is aware of its own whole house power demand and, with that information, the group of HEMs can coordinate the duty (On/Off) cycles of the various appliances (including plug-in vehicles) associated with their own home in order to maintain transformer 122's operational states and thereby limit stress on the transformer. The groups' efforts at coordination may also take into consideration (make assumption) of usage in other homes connected to their local transformer but which may not be equipped with their own HEM.

For effective control, a control target is defined that, in this case, is a maximum local aggregate power demand. In order to obtain the demand target, each HEM 150, 1252, 154 requests the constraint associated with its local transformer 122 from, for example, demand response server (DRS) 112 associated with the Central Facility 110 using the identifier established for its local transformer 122.

After establishing the constrains under which the various HEMs must operate, they may then employ low-frequency Pulse Width Modulation (PWM) techniques to actuate the various devices (appliances 160, 162, 164, 170, 172, 174, 180, 182, 184 and plug-in vehicles 190, 192, 194) over which they exercise operational control. In the instance of the plug-in vehicles 190, 192, 194 such control may correspond to controlling charging times and/or rates of their batteries. In the case of other appliance, such control may correspond to establishing specific maximum duty cycles and/or permitted operational times.

Further in accordance with the present subject matter, the members of the group of HEMs 150, 152, 154 communicate data among themselves on a fixed cycle period, generally on the order of every five (5) minutes however other time periods may also be used. At such times the HEMs communicate their expected average demand and a schedule of expected interval demand, possibly at a faster sample rate, for the next cycle period. The HEMs may also communicate their average demand over an extended number of periods so as to convey to the other HEMs future availability for load shifting and/or shedding. All HEMs may then use the shared data together with any additional optional information from the DRS regarding the total number of houses coupled to the transformer to negotiate among themselves suitable control signals for their own homes to provide the transformer stress relief sought.

When the HEMs evaluate the shared data, there are three possible outcomes: (1) If the aggregate average demand and the aggregate scheduled demand are below the transformer constraint, then no shifting or shedding needs to occur. (2) If the average demand is below the constraint but the scheduled demand is above the constraint, then load shifting is needed. (3) If the average demand is above the constraint, then load shedding is needed.

Load shifting is accomplished by shifting the duty (On/Off) cycle (times) of the PWM of the various devices. Load shedding is accomplished by reducing the maximum duty cycle of the various devices. This process is illustrated with present reference to flow chart 200 FIG. 2. As illustrated, at the beginning of one of the periodic data sharing cycles, the process starts by determining at step 202 whether the aggregate average demand is less than the transformer constraint. If it is, a determination is then made at step 204 whether the aggregate scheduled demand is below (less than) the transformer constraint. If this condition is true also, the process returns to the start sequence at the beginning of the next periodic data sharing cycle.

If, on the other hand, step 202 determines that the aggregate average demand is not less (that is, it is above) the constraint, then the process proceeds to step 206 where a determination is made as to whether the aggregate scheduled demand is above (greater than) the constraint. If this step is true a load shifting process begins at step 208. Conversely, if at step 206 the process determines that the aggregate scheduled demand is not above (greater than) the constraint, the process then moves to step 210 where it is determined whether the average demand is above (greater than) the constraint. If so, the process starts a load shedding procedure at step 212.

In accordance with one aspect of the present subject matter HEMs 150, 152, 154 are aware of the various products/appliances/loads that are on line and are able to monitor the overall home load via the AMI or alternatively through monitoring of their associated individual home utility meter. With this information, the HEMs may be configured to control their various respective appliances/vehicle charging in conjunction with the other HEMs in their group using PWM techniques.

With present reference to FIG. 3 there is illustrated an exemplary home PWM operation in accordance with the present subject matter. As illustrated in FIG. 3, the aggregated load control of individual homes forming a sub group of homes may be controlled so that not only the individual homes overall (collectively) but also the appliances within each home are controlled to maintain an aggregate usage level meeting the constraints required for their local transformer 122. For example, as illustrated in FIG. 3, house #1 may begin HEM controlled energy usage and then, after a controlled period of time, turn off a plug-in vehicle charging device for a predetermined time period, followed by controlled interruptions of the operation of HVAC systems and home refrigerators. In exemplary embodiments of the present subject matter such "off" periods may be set to 10 minutes. Alternative times, of course, may be set as well as differing times based on the particular appliances to be controlled.

With further reference to FIG. 3, it will be appreciated that in accordance with the present disclosure, the other houses (house #2 and house #3) that are part of the group similarly control, via their respective HEM, their appliances to be cycled off for predetermined times but do so in concert with the HEM controlling house #1 so that not all of the controlled appliances in all of the homes of the group are on at the same time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy management system, comprising:
a central control system comprising a demand response server;
a power transmission system configured to supply electrical power to a plurality of user locations by way of a common local transformer; and
a plurality of home energy management systems in communication with said demand response server, each of said plurality of home energy management systems configured for communications with at least one home appliance,
wherein said demand response server is configured to transmit local transformer identification and local transformer constraint information to each of said plurality of home energy management systems whereby each of the plurality of home energy management systems that share the common local transformer together form a local network based on said transformer identification, such that each home energy management system in the local network is configured to communicate shared data with each of the other home energy management systems in the local area network and whereby each of said plurality of home energy management systems instructs the at least one home appliance to modify its energy consumption based at least in part on the shared data and the local transformer constraint information.

2. A system as in claim 1, wherein each of said home energy management systems is configured to control said at least one home appliance by at least one of permitting normal operation thereof, implementing load shifting, and implementing load shedding.

3. A system as in claim 1, wherein said at least one home appliance is configured to operate using a duty cycle based on criteria provided by instructions from its home energy management system.

4. A system as in claim 1, wherein said plurality of home energy management systems is configured to negotiate among each other via the local network to meet an aggregate energy consumption level.

5. A system as in claim 1, further comprising:
at least one additional home appliances in communications with said at least one of said plurality of home energy management systems,
wherein said home energy management system is configured to control each of the appliances with which it communicates to provide control of the appliances to achieve an aggregate energy usage.

6. A system as in claim 1, wherein said plurality of home energy management systems are each configured to estimate energy usage from usage locations served by said local transformer that have not shared data with the locally networked home energy management systems and to employ such estimated usage when controlling their own appliances.

7. A system as in claim 6, wherein said plurality of home energy management systems is configured to negotiate among each other via the local network to meet an aggregate energy consumption level.

8. A system as in claim 7, wherein said plurality of home energy management systems is configured so that individual homes are collectively controlled with the appliances within each home to maintain a negotiated energy usage level.

9. A method for management of energy usage, comprising:
coupling a plurality of user locations to a common local transformer to provide electrical power to said user locations;
coupling a home energy management system to at least one appliance at at least some of the user locations;
sending information regarding transformer identification and transformer constraints to each of the home energy management system;
implementing a local network among the home energy management systems that share the common local transformer based on the transformer identification;
sharing usage data associated with each home energy management system within the local network; and
operating the at least one appliance based at least in part on the shared data and the transformer constraint information, wherein the plurality of home energy management systems is configured to negotiate via the local network how to meet the transformer constraint.

10. A method as in claim 9, wherein each of the home energy management systems is configured to control the at least one home appliance by at least one of permitting normal operation thereof, implementing load shifting, and implementing load shedding.

11. A method as in claim 9, wherein the at least one home appliances is configured to operate using a duty cycle based on criteria provided by instructions from its home energy management system.

12. A method as in claim 9, further comprising:
coupling at least one additional home appliances to the home energy management systems; and
controlling each appliances with which the home energy management system is coupled to provide control of the appliances to achieve the transformer constraint.

13. A method as in claim 9, wherein the plurality of home energy management systems are each configured to estimate energy usage from usage locations served by the local transformer that have not shared data with the locally networked home energy management systems and to employ such estimated usage when controlling their own appliances.

14. A method as in claim 13, wherein said plurality of home energy management systems is configured to negotiate how to meet the transformer constraint.

15. A method as in claim 14, wherein said plurality of home energy management systems is configured so that individual homes are collectively controlled with the appliances within each home.

16. A power distribution and control system, comprising:
a central control system;
a source of power;
at least one local transformer;
a plurality of power consumption locations each coupled to receive power from said at least one local transformer;
at least one power consuming device located at each of said plurality of power consumption locations;
an energy management device located at each of said plurality of power consumption locations; and
an advanced metering infrastructure configured to provide communications between said central control system and each said energy management device,
wherein said central control system is configured to transmit local transformer identification and local transformer constraint information to each of said energy management devices whereby each of the plurality of energy management devices that share the at least one local transformer together form a local network based on said transformer identification, such that each home energy management system in the local network is configured to communicate shared data with each of the other home energy management systems in the local area network, and whereby each of said plurality of energy management devices instructs the at least one home appliance to modify its energy consumption based at least in part on the shared data to meet the constraints of the local transformer.

17. A system as in claim 16, wherein said energy management devices are configured to negotiate among themselves how to meet the constraints of the local transformer.

18. A system as in claim 17, wherein said central control system is configured to transmit information to the energy management devices relating to the total number of user locations couple to said local transformer and wherein the energy management devices are configured to negotiate among themselves how to meet the constraints of the local transformer based at least in part on estimations of usage from usage locations not sharing data with the locally networked energy management devices.

19. A system as in claim 18, wherein the energy management devices are configured to collectively control individual home appliances within each home to meet the constraints of the local transformer.

* * * * *